United States Patent
Leao et al.

(10) Patent No.: US 11,138,357 B1
(45) Date of Patent: Oct. 5, 2021

(54) FORMAL VERIFICATION WITH EDA APPLICATION AND HARDWARE PROTOTYPING PLATFORM

(71) Applicant: Cadence Design Systems, Inc., San Jose, CA (US)

(72) Inventors: Tulio Paschoalin Leao, Betim (BR); Petros Daniel Fernandes de Medeiros Félix, Belo Horizonte (BR); Julia Pinheiro de Oliveira, Belo Horizonte (BR); Arthur Ribeiro Araujo, Belo Horizonte (BR); Lucas Martins Chaves, Belo Horizonte (BR); Andrei dos Santos Silva, Belo Horizonte (BR); Pablo Nunes Agra Belmonte, Belo Horizonte (BR)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/875,113

(22) Filed: May 15, 2020

(51) Int. Cl.
| | |
|---|---|
| *G06F 30/30* | (2020.01) |
| *G06F 30/3323* | (2020.01) |
| *G06F 30/331* | (2020.01) |
| *G06F 30/31* | (2020.01) |

(Continued)

(52) U.S. Cl.
CPC .......... *G06F 30/3323* (2020.01); *G06F 30/31* (2020.01); *G06F 30/33* (2020.01); *G06F 30/331* (2020.01); *G06F 2119/16* (2020.01)

(58) Field of Classification Search
CPC ........ G06F 30/31; G06F 30/33; G06F 30/331; G06F 30/3323; G06F 2119/16
See application file for complete search history.

(56) References Cited

U.S. PATENT DOCUMENTS

| | | | |
|---|---|---|---|
| 7,853,903 B1 | 12/2010 | Goldberg et al. | |
| 7,992,113 B1 * | 8/2011 | Goldberg ............ | G06F 30/3323 716/106 |
| 8,341,567 B1 | 12/2012 | Tiwary et al. | |

(Continued)

OTHER PUBLICATIONS

P.H.W. Leong et al., "A Bitstream Reconfigurable FPGA Implementation of the WSAT Algorithm," IEEE Trans, on Very Large Scale integration (VLSI) Systems, vol. 9, No. 1, Feb. 2001, pp. 197-201. (Year: 2001).*

(Continued)

*Primary Examiner* — Leigh M Garbowski
(74) *Attorney, Agent, or Firm* — Tarolli, Sundheim, Covell & Tummino LLP

(57) ABSTRACT

A formal verification EDA application can be configured to receive a circuit design of an IC chip. The circuit design of the IC chip comprises a set of properties for the IC chip and constraints for the IC chip. The formal verification EDA application generates an array of CNF files based on the circuit design of the IC chip. Each CNF file can include a Boolean expression that characterizes a selected property of the set of properties and data fields characterizing initial states for literals in the Boolean expression and the constraints of the IC chip. The formal verification application can also be configured to output the array of CNF files to a hardware prototyping platform. The hardware prototyping platform can be configured to execute a hardware instantiated SAT solver for the Boolean expression in each CNF file in the array of CNF files.

20 Claims, 6 Drawing Sheets

(51) Int. Cl.
G06F 30/33 (2020.01)
G06F 119/16 (2020.01)

(56) References Cited

U.S. PATENT DOCUMENTS

| | | | |
|---|---|---|---|
| 8,458,107 B2* | 6/2013 | Cantin | G06N 20/00 |
| | | | 706/13 |
| 9,177,089 B2 | 11/2015 | Hanna et al. | |
| 10,366,330 B2* | 7/2019 | Yu | G06N 5/02 |
| 10,896,277 B1* | 1/2021 | Pedneau | G06F 30/23 |

OTHER PUBLICATIONS

T. Suyama et al., "Solving Satisfiability Problems Using Reconfigurable Computing," IEEE Trans. on Very Large Scale Integration (VLSI) Systems, vol. 9, No. 1, Feb. 2001, pp. 109-116. (Year: 2001).*

G. Li et al., "Design Error Diagnosis Based on Verification Techniques," Proc. of the 12th Asian Test Symposium (ATS'03), 2003 IIII Computer Society, 4 pages. (Year: 2003).*

A. Veneris et al., "Fault Diagnosis and Logic Debugging Using Boolean Satisfiability," Proc. of the Fourth Int'l Workshop on Microprocessor Test and Verification Common Challenges and Solutions (MTV'03), 2003 IEEE Computer Society, 6 pages. (Year: 2003).*

R.H.C. Yap et al., "Hardware Implementations of Real-Time Reconfigurable WSAT Variants," FPL 2003, LNCS 2778, Springer-Verlag Berlin Heidelberg, pp. 488-496. (Year: 2003).*

I. Skliarova et al., "A Software/Reconfigurable Hardware SAT Solver," IEEE Trans. on Very Large Scale Integration (VLSI) Systems, vol. 12, No. 4, Apr. 2004, pp. 408-419 (Year: 2004).*

E. Gregoire e tal., "Automatic extraction of functional dependencies," Theory and Applications of Satisfiability Testing: 7th Int'l Conference (SAT 2004), pp. 122-132. (Year: 2005).*

K. Gulati et al., "FPGA-Based Hardware Acceleration for Boolean Satisfiability," ACM Trans. on Design Automatic of Electronic Systems, vol. 14, No. 2, Article 33, Mar. 2009, pp. 1-11. (Year: 2009).*

M. Suzuki et al., "Variable and Clause Elimination in SAT problems using an FPGA," 2011 IEEE, 8 pages. (Year: 2011).*

"Certus ASIC Prototyping Debug Solution," Tektronix Datasheet, Sep. 19, 2012, 4 pages. (Year: 2012).*

Y.-C. Chen et al., "Verification of Reconfigurable Binary Decision Diagram-Based Single-Electron Transistor Arrays," IEEE Trans. on Computer-Aided Design of Integrated Circuits and Systems, vol. 32, No. 10, Oct. 2013, pp. 1473-1483. (Year: 2013).*

K. Kanazawa et al., "Solving SAT-encoded Formal Verification Problems on SoC based on a WSAT Algorithm with a New Heuristic for Hardware Acceleration," 2013 IEEE 7th Int'l Symposium on Embedded Multicore/Manycore System-on-Chip, IEEE Computer Society, pp. 101-106. (Year: 2013).*

Y. Yuan et al., "An Equivalence Checking Algorithm Based on Cut0set Match of Gate-level Circuits," 2013 Int'l Conference on Mechatronic Sciences, Electrical Engineering and Computer (MEC), 2013 IEEE, pp. 2344-2349. (Year: 2013).*

Velev "Efficient translation of Boolean Formulas to CNF in Formal Verification of Microporcessors" Department of Electrical and Computer Engineering, Carnegie Mellon University, Pettsburgh, PA 15213, 2004, pp. 310-315.

Bousmar, et al. "A pure hardware k-SAT solver architecture for FPGA based on generic tree-search", 2017 29th International Conference on Microelectronics (ICM), 5 pages.

Nadel, "Understanding and Improving a Modern SAT Solver" Tel Aviv University Raymond and Beverly Sackler Faculty of Exact Sciences The Blavatnik School of Computer Sciencek, Aug. 2009, 148 pages.

* cited by examiner

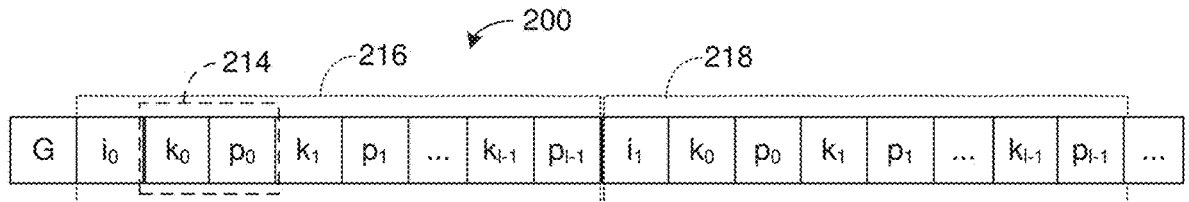

G is a number of OR clauses in the Boolean expression that are fed into an AND gate;

i is a number of literals in a corresponding OR clause identified in a subscript;

k is a variable index, wherein the index is provided in a subscript;

p is a variable polarity (active high or active low) for the variable identified by the variable index in a preceding block, wherein the index is provided in a subscript

FIG. 2

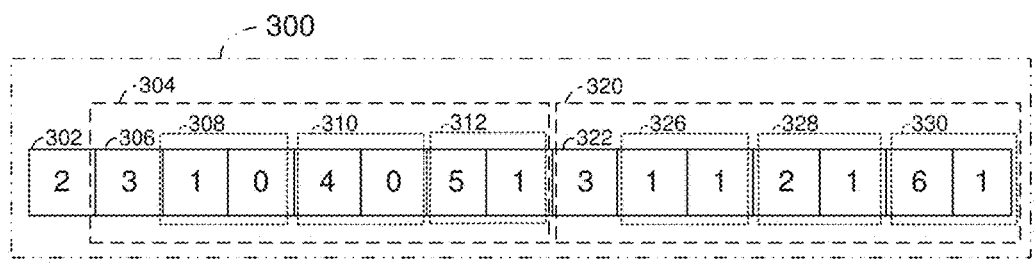

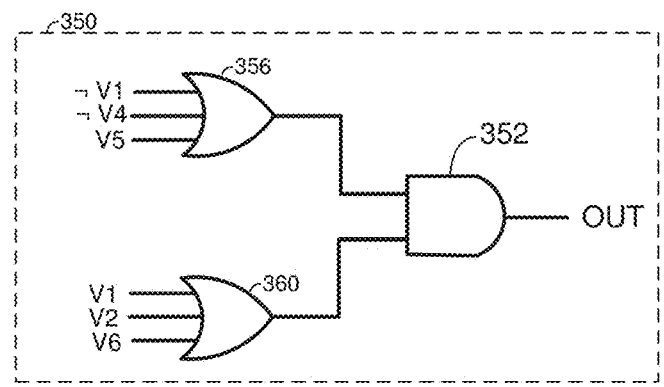

FIG. 3

FORMAL VERIFICATION WITH EDA APPLICATION AND HARDWARE PROTOTYPING PLATFORM

TECHNICAL FIELD

This disclosure relates to electronic design automation (EDA) applications. More particularly, this disclosure relates to executing formal verification of a circuit design using a formal verification EDA application and a hardware prototyping platform.

BACKGROUND

EDA, also referred to as electronic computer-aided design (ECAD), is a category of software applications for designing electronic systems such as integrated circuits and printed circuit boards. The applications work together in a design flow that chip designers use to design and analyze entire semiconductor chips. Since modern semiconductor chips can have billions of components, EDA applications are essential for their design. As one example, EDA applications can include logic synthesis, logic simulation and formal verification.

Formal verification is the use of formal verification software (a type of EDA application) to execute the task of verifying that the logic design conforms to specification. This is a complex task and may take a considerable time and effort in most large electronic system design projects. Most formal verifications are executed on the gate level of a circuit.

Field-programmable gate array (FPGA) prototyping, also referred to as FPGA-based prototyping, application specific integrated circuit (ASIC) prototyping or system-on-chip (SoC) prototyping, is the method to prototype SoC and application-specific integrated circuit designs on FPGAs for hardware verification and early software development.

In logic and computer science, the Boolean satisfiability problem (sometimes called the propositional satisfiability problem and abbreviated SATISFIABILITY or SAT) is the problem of determining if there exists an interpretation that satisfies a given Boolean formula. Stated differently, the SAT problem asks whether the literals (variables) of a given Boolean formula can be consistently replaced by the values TRUE or FALSE in such a way that the formula evaluates to TRUE. If this is the case, the formula is called satisfiable. On the other hand, if no such assignment exists, the function expressed by the formula is FALSE for all possible variable assignments and the formula is unsatisfiable. For example, the formula "a AND NOT b" is satisfiable because one can find the values a=TRUE and b=FALSE, which make (a AND NOT b)=TRUE. In contrast, "a AND NOT a" is unsatisfiable.

SUMMARY

One example relates to a non-transitory machine readable medium having machine readable instructions. The machine readable instructions can include a formal verification EDA application. The formal verification EDA application can be configured to receive a circuit design of an integrated circuit (IC) chip comprising a set of properties for the IC chip and constraints for the IC chip. The formal verification EDA application generate an array of conjunctive normal form (CNF) files based on the circuit design of the IC chip. Each CNF file in the array of CNF files can include a Boolean expression that characterizes a selected property of the set of properties and data fields characterizing initial states for literals in the Boolean expression and the constraints of the IC chip. The formal verification application can also be configured to output the array of CNF files to a hardware prototyping platform, the hardware prototyping platform being configured to execute a hardware instantiated SAT solver for the Boolean expression in each CNF file in the array of CNF files.

Another example relates to a system that can include a non-transitory memory that store machine readable instructions and a processing unit that accesses the memory and executes the machine readable instructions. The machine readable instructions can include a formal verification EDA application. The formal verification EDA application can be configured to receive a circuit design of an IC chip. The circuit design of the IC chip can include a set of properties for the IC chip and constraints for the IC chip. The formal verification EDA application can be configured to generate an array of CNF files based on the design of the IC chip. Each CNF file can include a Boolean expression that characterizes a selected property of the set of properties and data fields characterizing initial states for literals in the Boolean expression and the constraints of the IC chip. The system can also include a hardware prototyping platform, communicatively coupled to the formal verification EDA application. The hardware prototyping platform can be configured to execute a hardware instantiated SAT solver for each physically instantiated Boolean expression that corresponds to a CNF file of the array of CNF files. The hardware prototyping algorithm can return results of the hardware instantiated SAT solver for each Boolean expression to the formal verification EDA application.

Yet another example relates to a method that can include receiving a circuit design of an IC chip, the circuit design of the IC chip can include a set of properties for the IC chip. The method can also include generating, by a formal verification EDA application, an array of CNF files based on the design of the IC chip. Each CNF file can include a Boolean expression that characterizes a selected property of the set of properties and data fields characterizing initial states for literals in the Boolean expression. The method can also include executing, by a hardware prototyping platform, a hardware instantiated SAT solver for each Boolean expression that corresponds to a CNF file of the array of CNF files. The method can further include returning results of the hardware instantiated SAT solver for each Boolean expression to the formal verification EDA application.

BRIEF DESCRIPTION OF THE DRAWINGS

FIG. 2 illustrates a diagram of a CNF format for a file.

FIG. 3 illustrates an example of a CNF file representing a Boolean expression and a Boolean circuit representing the Boolean expression.

DETAILED DESCRIPTION

This disclosure relates to systems and methods for executing a formal verification of a circuit design of an IC chip by employing a formal verification EDA application operating in concert with a hardware prototyping platform. The system can include a computing platform that executes the formal verification EDA application.

The circuit design of the IC chip can include a set of properties for the IC chip and constraints for the IC chip. The formal verification engine can be configured to generate an array of CNF files based on the design of the IC chip. Each CNF file can include a Boolean expression that characterizes a selected property of the set of properties and data fields characterizing initial states for literals in the Boolean expression and the constraints of the IC chip.

The hardware prototyping platform, such as a FPGA platform, can be communicatively coupled to the formal verification EDA application. The hardware prototyping platform can be configured to process the array of CNF files and physically instantiate a Boolean circuit corresponding to the Boolean expression in each CNF file in the array of CNF files and execute a hardware instantiated SAT solver (e.g., a SAT circuit) for each physically instantiated Boolean circuit that corresponds to a CNF file of the array of CNF files. The hardware prototyping platform can return results of the hardware instantiated SAT solver for each Boolean circuit to the formal verification EDA application.

Results of the hardware instantiated SAT solver can be analyzed by the formal verification EDA application to determine if the formal verification of the circuit design is completed. If the formal verification is not completed, the formal verification EDA application can update the initial states in the CNF files of the array of CNF files and/or the constraints and provide the updated CNF files to the hardware prototyping platform. The hardware prototyping platform can repeat the process of physically instantiating the Boolean circuits and executing the hardware instantiated SAT solver. If the formal verification is completed, the formal verification application can provide results of the formal verification (e.g., identification of counter-examples (bugs)) to a remote system such that the circuit design of the IC chip may be updated or the IC chip may be fabricated.

Figure 1:
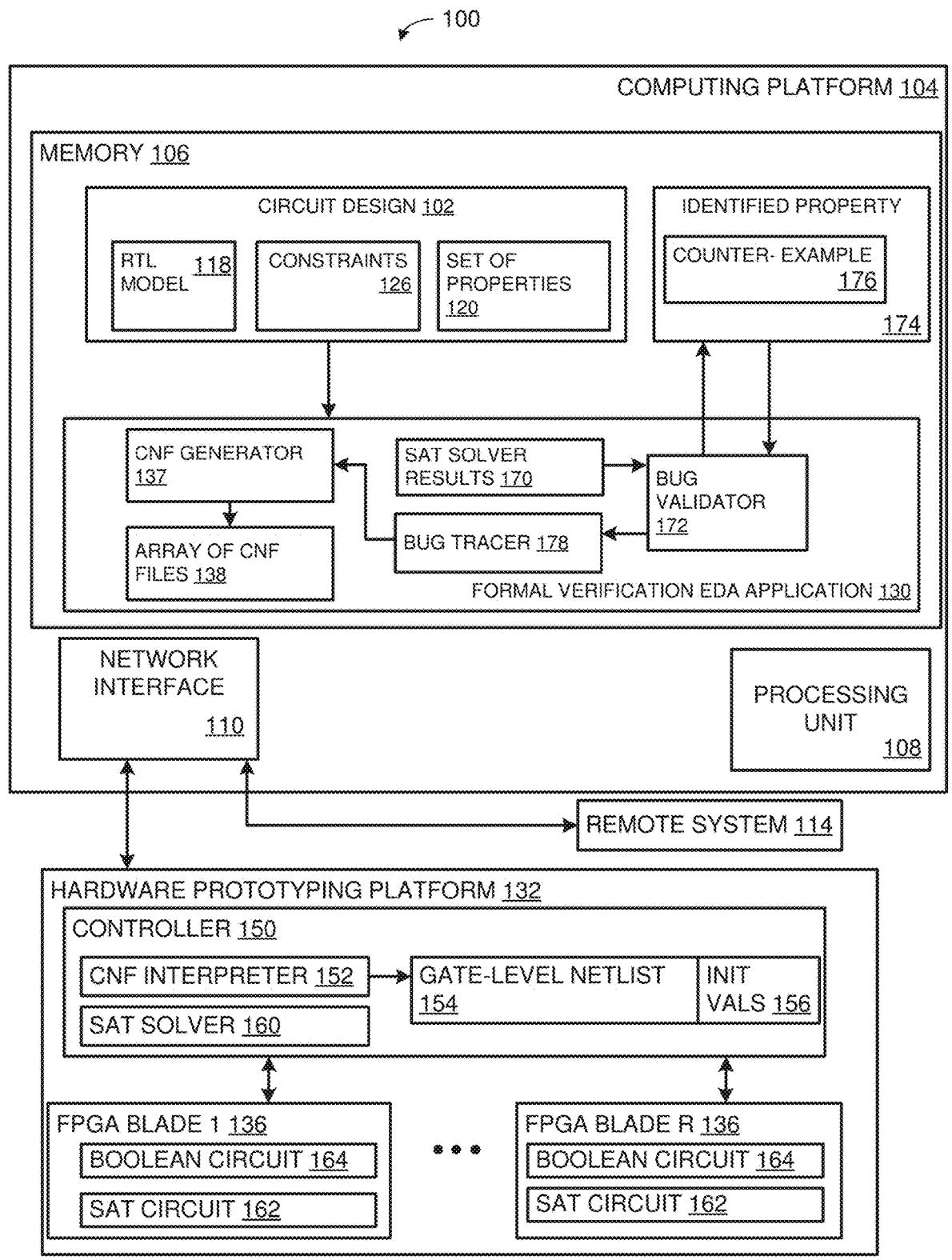
FIG. 1 illustrates an example of a system for executing a formal verification of a circuit design using a formal verification EDA application and a hardware prototyping platform.

FIG. 1 illustrates an example of a system 100 for executing a formal verification of a circuit design 102. The system 100 can include a computing platform 104. Accordingly, the computing platform 104 can include a memory 106 for storing machined readable instructions and data and a processing unit 108 for accessing the memory 106 and executing the machine readable instructions. The memory 106 represents a non-transitory machine readable memory (or other medium), such as random access memory (RAM), a solid state drive, a hard disk drive or a combination thereof. The processing unit 108 can be implemented as one or more processor cores. The computing platform 104 can include a network interface 110 (e.g., a network interface card) configured to communicate with other computing platforms via a network, such as a public network (e.g., the Internet), a private network (e.g., a local area network (LAN)) or a combination thereof (e.g., a virtual private network).

The computing platform 104 could be implemented in a computing cloud. In such a situation, features of the computing platform 104, such as the processing unit 108, the network interface 110, and the memory 106 could be representative of a single instance of hardware or multiple instances of hardware with applications executing across the multiple of instances (i.e., distributed) of hardware (e.g., computers, routers, memory, processors, or a combination thereof). Alternatively, the computing platform 104 could be implemented on a single dedicated server or workstation.

The circuit design 102 can be stored in the memory 106 of the computing platform 104. The circuit design 102 can be implemented, for example, as design specifications for an IC chip. The circuit design 102 can be generated with an EDA application, such as a logic synthesis application (e.g., a synthesis tool). In such a situation, an end-user of a remote system 114 can employ a user-interface to generate and/or modify hardware description language (HDL) code (e.g., Verilog) for generating a register-transfer level (RTL) model 118 (e.g., RTL code) characterizing a circuit, wherein the RTL model 118 is transformable by an EDA application into a physically realizable gate-level netlist for the circuit design 102.

Additionally, the circuit design 102 includes a set of properties 120 that define states for the circuit design 102, which if occur on a fabricated IC chip for the circuit design 102 would indicate that the circuit design has design errors (e.g., bugs). Stated differently, each property in the set of properties 120 identifies a particular set of conditions (e.g., variable values) that should not occur during operation of the corresponding fabricated IC chip. In the example illustrated, there can be one or more properties in the set of properties 120. Moreover, in examples where the circuit design 102 was generated with Verilog, the set of properties 120 may be referred to as a set of SystemVerilog Assertions (SVAs).

The circuit design 102 can include constraints 126. The constraints 126 (alternatively referred to as assumptions) of the circuit design 102 define rules, such as input states for the RTL model 118 for operating the IC chip characterized by the circuit design 102. Such constraints 126, if violated, would cause errors in a fabricated IC chip corresponding to the circuit design 102, wherein simulation and/or formal verification of such violations of the constraints 126 need not be evaluated. Stated differently, the constraints 126 define illegal (unpermitted) states of the IC chip corresponding to the circuit design 102, and the set of properties 120 define states that should not occur during operation of the IC chip corresponding to the circuit design 102.

In some examples, the circuit design 102 is updated through an iterative process. For instance, the circuit design 102 could be provided to a logic simulation EDA application that simulates operating a circuit corresponding to the circuit design 102 and the results of the simulation are employable to update the circuit design 102.

Before fabrication of an IC chip corresponding to the circuit design 102, the circuit design 102 is subjected to formal verification. Formal verification refers to the process of establishing functional correctness between the RTL model 118 and the set of properties 120 without running simulations. More specifically, formal verification is an exhaustive mathematical analysis to prove or disprove the correctness of a circuit design with respect to a set of properties (e.g., the set of properties 120) specifying intended design behavior. In chip hardware design, formal verification is a systematic process to verify that the design intent (property specification) is preserved in the implementation (the RTL model 118). Given the huge number of states in even a small design, it is impractical to simulate more than a miniscule percentage of design behavior. Moreover, the simulation is probabilistic and the chances of exercising every scenario that would reveal a design bug are relatively small. Corner-case bugs, namely bugs that require very specific conditions to be triggered, are often missed in simulation.

Formal verification statically analyzes the circuit design 102 for all possible input sequences (or some subset thereof) and all possible state values (or some subset thereof), checking to see if a property in the set of properties 120 can be violated. These violations are referred to as "counter-examples" since each represents a way in which the implementation does not match the specification of intended behavior. If no such counter-examples are found, formal verification can often prove that there is no possible way to violate any property of the set of properties 120 of the circuit design 102. An ideal formal verification is 100% exhaustive, proving each of the properties 120 of the circuit design 102 to be "safe" once all bugs have been found and fixed. However, in some situations, a 100% exhaustive verification may be impractical. Thus, the formal verification may be 90-99% exhaustive in some examples.

As one example, the system 100 receives the circuit design 102 that includes the RTL model 118, the set of properties 120 and the constraints 126 via the network interface 110. The computing platform 104 stores the circuit design 102 in the memory 106.

The memory 106 includes a formal verification EDA application 130 that can operate in concert with a hardware prototyping platform 132 to execute a formal verification of the circuit design 102. The hardware prototyping platform 132 can be implemented as an FPGA prototyping platform that can implement gate-level prototypes for circuit designs (possibly including, but not limited to the circuit design 102) on R number of FPGA blades 136, where R is an integer greater than or equal to one. Thus, the hardware prototyping platform 132 can be implemented as an interconnected rack for the R number of FPGA blades 136. The R number of FPGA blades 136 can be implemented as FPGAs with about 1 million to about 4 million gates. As one particular example, the FPGA blades 136 can have about 1.8 million gates. Each FPGA blade 136 can physically instantiate gate level circuit designs. Stated differently, each FPGA blade 136 can physically instantiate FPGA programmed circuits. Moreover, although FIG. 1 illustrates one instant of a hardware prototyping platform 132. In other examples, there could be multiple hardware prototyping platforms operating in parallel.

In some examples, the hardware prototyping platform 132 can communicate with the computing platform 104 via the network interface 110. In other examples, the hardware prototyping platform 132 can be connected to the computing platform 104 with a proprietary connection.

The formal verification EDA application 130 includes a CNF generator 137 that can analyze the circuit design 102 to generate an array of CNF files 138 for the hardware prototyping platform 132. The array of CNF files 138 can have one or more CNF files. Each CNF file (alternatively referred to as a CNF formula) in the array of CNF files 138 can include a Boolean expression representing a property of the set of properties 120 of the circuit design 102. The Boolean expression in each CNF file of the array of CNF files 138 can be based on the RTL model 118 and the corresponding property in the set of properties 120 of the circuit design 102. The Boolean expression in each CNF file of the array of CNF files 138 includes a plurality of Boolean operators with variable input states. The Boolean expression in each CNF file of the array of CNF files 138 is generated by the CNF generator 137 such that if the entirety of the Boolean expression is TRUE, a counter-example of a corresponding property in the set of properties 120 has been established. Stated differently, the Boolean expression in each CNF file represents a Boolean characterization of a corresponding property in the set of properties 120.

Some CNF files in the array of CNF files 138 can correspond to different properties in the set of properties 120 of the circuit design 102. Additionally, there can be multiple CNF files with different initial states for the same property in the set of properties 120 of the circuit design 102 to facilitate parallel processing of a search space of a Boolean expression characterized in the CNF files.

The CNF generator 137 can also add the constraints 126 (or some subset thereof) to data fields of each CNF file in the array of CNF files 138. The constraints 126 included in data fields of each CNF file can represent illegal variable states for the corresponding Boolean expression. That is, the constraints 126 define variable states that violate the circuit design 102.

FIG. 2 illustrates a diagram 200 with a legend 210 demonstrating a format of a Boolean expression for a CNF file of the array of CNF files 138 of FIG. 1. The Boolean expression represented can have N number of literals, where N is an integer greater than or equal to one. The diagram 200 can be implemented, for example with an array of integers in cells. In the diagram 200, identifiers (implemented as letters) are employed to represent an organization of the Boolean expression. More particularly, as indicated by the legend 210 in the diagram 200, the identifiers within cells indicate the following:

G is a number of OR clauses in the Boolean expression that are fed into an AND gate;
i is a number of literals in a corresponding OR clause identified in a subscript;
k is a variable index, wherein the index is provided in a subscript; and
p is a variable polarity (active high or active low) for the variable identified by the variable index in a preceding block, wherein the index is provided in a subscript.

In the diagram 200, a literal box 214 with two cells represents an example of a literal definition. In the literal box 214, a first identifier, $k_0$ represents a first literal, of the N number of literals of the Boolean expression and a second identifier, $p_0$ represents a polarity (active high or active low) for the first literal of the N number of literals of the Boolean expression represented in the CNF file.

Additionally, in the diagram 200, a first clause box 216 represents a first OR clause of the Boolean expression represented by the CNF file and a second clause box 218 represents a second OR clause of the Boolean expression represented by the CNF file. In the first clause box 216, an identifier, $i_0$ in a first cell of the first clause box 216 represents a number of literals (of the N number of literals) in the first OR clause. Thus, in the first OR clause, there would be $i_0$ number of literals. Similarly, in the second clause box 218, an identifier, $i_1$ in a first cell of the second clause box 218 represents a number of literals (of the N number of literals) in the second OR clause. Thus, in the second OR clause, there would be $i_1$ number of literals.

FIG. 3 illustrates an example of a simple Boolean expression 300 represented with the CNF format depicted by the diagram 200 of FIG. 2. The example of the Boolean expression 300 is referred to as a given example ("given example"). The Boolean expression 300 in CNF format can alternatively be represented with Equation 1.

$$(\neg V1 + \neg V4 + V5) \cdot (V1 + V2 + V6) \quad \text{Equation 1:}$$

Wherein:
¬ represents the NOT logical operator;
+ represents the OR logical operator;
· represents the AND logical operator; and
V1, V2, V4, V5 and V6 represent literals (Boolean variables).

In the Boolean expression 300, there are five literals (N=5), and a clause count cell 302 includes an integer value 2, indicating that there are two OR clauses of the Boolean expression 300, and that an output of these two OR clauses are provided as inputs to an AND gate.

A first clause box 304 defines a first OR clause of the two OR clauses for the Boolean expression 300. The first clause box 304 includes a first cell 306 that includes an integer value 3, indicating that there are three literals (variables) input into a first OR clause.

A first literal box 308 of the first clause box 304, representing the first OR clause of the Boolean expression 300, includes two cells, with the first cell having an integer value 1 and the second cell having an integer value 0. The first cell of the first literal box 308 (with integer value 1) indicates that the first input of the first OR clause is a first literal, V1 of the five literals of the Boolean expression 300. Additionally, the second cell of the first literal box 308 (with integer value 0) indicates the first literal, V1 has a polarity of active low, such that the literal represented by the first literal box 308 of the first clause box 304 can be represented as ¬V1. Similarly, a second literal box 310 of the first clause box 304, includes two cells, with the first cell having an integer value 4 and second cell having an integer value 0. Thus, the second literal box 310 can be represented as ¬V4. A third literal box 312 of the first clause box 304 includes two cells with integer values, 5, 1 respectively, indicating that the literal represented by the third literal box 312 can be represented as V5 (active high).

A second clause box 320 defines a second OR clause of the two or clauses for the Boolean expression 300. The second clause box 320 includes a first cell 322 that includes an integer value 3, indicating that there are three literals (variables) input into a second OR clause. A first literal box 326 of the second clause box 320 includes two cells with integer values, 1, 1 respectively, indicating that the literal represented by the third literal box 312 can be represented as V1 (active high). A second literal box 328 of the second clause box 320 includes two cells with integer values, 2, 1 respectively, indicating that the literal represented by the third literal box 312 can be represented as V2 (active high). A third literal box 330 of the second clause box 320 includes two cells with integer values, 6, 1 respectively, indicating that the literal represented by the third literal box 312 can be represented as V6 (active high).

FIG. 3 also includes a circuit 350 that can be employed to physically instantiate the Boolean expression 300 in the given example. The circuit 350 may be referred to as a Boolean circuit. The circuit 350 is a gate-level design with an AND gate 352 having two inputs. The number of inputs to the AND gate 352 can be defined by the value in the clause count cell 302. An output of the AND gate 352, OUT represents an output for the Boolean expression 300.

An output of a first OR gate 356 is coupled to a first input of the AND gate 352. The first OR gate 356 is configured to represent the first OR clause of the Boolean expression 300, which is characterized by the first clause box 304. Thus, the first OR gate 356 has three inputs, ¬V1, ¬V4 and V5. An output of a second OR gate 360 is coupled to a second input of the AND gate 360. The second OR gate 360 is configured to represent the second OR clause of the Boolean expression 300. Thus, the second OR gate 356 has three inputs, V1, V2 and V6. In this manner, the circuit 350 has six inputs, ¬V1, ¬V4 and V5 that are input into the first OR gate 356 and V1, V2 and V6 that are input into the second OR gate 360. The circuit 350 also has one output, namely, the output of the AND gate 352, OUT. Accordingly, the circuit 350 can physically instantiate the Boolean expression 300.

Referring back to FIG. 1, in some examples, the CNF generator 137 can add initial states for literals (variables) in the Boolean expression to data fields for each CNF file of the array of CNF files 138 that can facilitate bug hunting during formal verification. The initial states can be selected, for example based on the type of bug hunting algorithm employed by the formal verification EDA application 130. As some examples, the bug hunting algorithm could be a swarm trace bug hunting algorithm or a state swarm bug hunting algorithm.

In response to generating the array of CNF files 138, the formal verification EDA application 130 can send the array of CNF files 138 (or some subset thereof) to the hardware prototyping platform 132. The hardware prototyping platform 132 can include a controller 150. In some examples, the controller 150 can be implemented as (and represent) a computing platform, such as a non-transitory machine readable memory (e.g., RAM, flash memory, a solid state drive and/or a hard disk drive) that stores machine readable instructions and a processing unit (e.g., one or more processor cores) that accesses the memory and executes the machine readable instructions. In other examples, the controller 150 can be implemented as a microcontroller that stores embedded instructions.

The controller 150 can be configured to control operations on the R number of FPGA blades 136. More particularly, the controller 150 can send instructions to a selected FPGA blade 136 causing the selected FPGA blade 136 to physically instantiate a circuit based on the instructions and to execute particular operations on the circuit. In general, circuits implemented by the selected FPGA blade 136 can be gate-level circuits, such as circuits to implement ASIC prototypes, SoC prototypes, etc.

The controller 150 can include a CNF interpreter 152 that receives and processes the array of CNF files 138 from the formal verification EDA application 130. The controller 150 can include a SAT solver 160. The SAT solver 160 can include a gate-level netlist and operations that are executable by the R number of FPGA blades 136 to implement a hardware instantiated SAT solver, which can be referred to as a SAT circuit 162. The controller 150 can provide the SAT solver 160 to the selected FPGA blade 136. In response, the selected FPGA blade 136 can physically instantiate a SAT circuit 162.

In some examples, each instance of the SAT circuit 162 can operate as a specific purpose processor with an instruction set (e.g., opcode) for solving the SAT problem. In such a situation, the CNF interpreter 152 can convert each CNF file in the array of CNF files 138 into a format consumable by the corresponding SAT circuit 162. As an example, the CNF interpreter 152 can convert each CNF file into a set of instructions (e.g., opcode) that would cause the corresponding SAT circuit 162 to execute the SAT problem on a particular Boolean expression and store each such set of instructions in a memory of the hardware prototyping platform 132. For instance, in the given example, the CNF interpreter 152 could generate a set of instructions that, when executed cause the corresponding SAT circuit 162 to evaluate the SAT problem on the Boolean expression described in Equation 1. In this situation, the set of instructions generated by the CNF interpreter 152 could also characterize the initial states included in the corresponding CNF file.

In operation, the SAT circuit 162 of the selected FPGA blade 136 executes a search on a portion of a state space of the Boolean expression of the corresponding instruction set for a potential counter-example. The state space is defined by the set of possible values of input literals for the Boolean expression for the corresponding instruction set. Additionally, the SAT circuit 162 (operating as a specific purpose processor) can search for values that cause the Boolean expression to output a logical 1 (e.g., TRUE) until a criterion is met. In some examples, the criterion can be a determination that a full search of a search space for the Boolean expression characterized in the instruction set has been completed, such that the SAT circuit 162 determines that the solution to the Boolean expression characterized in the instruction set is potentially unreachable. In other examples, the SAT circuit 162 can be configured to stop a search after a predetermined number of potential counter-examples are found. The predetermined number could be one or more. Each potential counter-example can be a set of values for the input literals that cause the Boolean expression corresponding to the set of instruction provided by the CNF interpreter 152 to output a logical 1. In still other examples, the SAT circuit 162 can be configured to stop the search once a search algorithm being executed (e.g., a depth first or breadth first search algorithm) reaches a dead-end. The listed criteria are not meant to be exclusive. That is, in some examples, the SAT circuit 162 can be configured to stop when any of the criteria are met (or some subset thereof).

In other examples, the CNF interpreter 152 can convert each CNF file in the array of CNF files 138 into a gate-level netlist 154 that can be physically instantiated as a circuit by a corresponding FPGA blade 136. That is, the CNF interpreter 152 can generate a gate-level netlist 154 that is employable to physically instantiate a Boolean expression characterized in a corresponding CNF file. The CNF interpreter 152 can also parse the CNF files in the array of CNF files 138 to generate initial values 156 as inputs for literals in the circuit implemented by the gate-level netlist. The controller 150 can be configured to provide each gate-level netlist 154 generated by the CNF interpreter 152 and a corresponding set of initial values 156 to a selected FPGA blade 136. In some examples, the controller 150 can provide multiple instances of the gate-level netlist 154 to a set of the R number of FPGA blades 136. In response, the selected FPGA blade 136 can physically instantiate a circuit (e.g., a gate-level circuit) characterized by the gate-level netlist 154, which circuit can be referred to as a Boolean circuit 164.

In these examples, the selected FPGA blade 136 can employ the corresponding set of initial values 156 as initial inputs for the Boolean circuit 164. Furthermore, the selected FPGA blade 136 can execute the operations characterized by the SAT solver 160 (via the SAT circuit 162) on the Boolean circuit 164. More particularly, the SAT circuit 162 executes SAT solver operations on the Boolean circuit 164, searching for a set of input values that make the Boolean circuit 164 output a logical 1 (e.g., a TRUE value).

Continuing with the given example, it is presumed that the Boolean circuit 164 implemented by the selected FPGA blade 136 illustrated in FIG. 3 is the circuit 350 illustrated in FIG. 3. In the given example, the Boolean circuit 164 has five literals, namely, V1, V2, V4, V5 and V6. More specifically, the circuit 350 of FIG. 3 has literals ¬V1, ¬V4 and V5 that are input into the first OR gate 356 of FIG. 3 and has three literals V1, V2 and V6 that are input into the second OR gate 360 of FIG. 3. In the given example, the SAT circuit 162 of the selected FPGA blade 136 searches for values that cause the AND gate 352 of FIG. 3 to output a logical 1 (e.g., TRUE).

In these such examples, the SAT circuit 162 of the selected FPGA blade 136 executes a search on a portion of a state space of the Boolean circuit 164 for a potential counter-example. In such a situation, the state space is defined by the set of possible values of input literals for the corresponding Boolean circuit 164. The SAT circuit 162 of the selected FPGA blade 136 continues to search for values that cause the Boolean circuit 164 to output a logical 1 (e.g., TRUE) until a criterion is met. In some examples, the criterion can be a full search of a search space for the Boolean circuit 164 has been completed, such that the SAT circuit 162 determines that the solution to the Boolean circuit 164 is potentially unreachable. In other examples, SAT circuit 162 can be configured to stop a search after a predetermined number of potential counter-examples are found. The predetermined number could be one or more. Each potential counter-example can be a set of values for the input literals that cause the Boolean circuit 164 to output a logical 1. In still other examples, the SAT circuit 162 can be configured to stop the search once a search algorithm being executed (e.g., a depth first or breadth first search algorithm) reaches a dead-end. The listed criteria are not meant to be exclusive. That is, in some examples, the SAT circuit 162 can be configured to stop when any of the criteria are met (or some subset thereof).

Continuing with the given example, it is presumed that the SAT circuit 162 for the selected FPGA blade R 136 is configured to stop searching once the SAT circuit 162 finds three potential counter-examples. Thus, in the given example, the SAT circuit 162 for the selected FPGA blade R 136 may find the values identified in Table 1.

TABLE 1

| LITERAL | VALUE | VALUE | VALUE |
|---------|-------|-------|-------|
| V1      | 0     | 1     | 1     |
| V2      | 0     | 0     | 1     |
| V4      | 0     | 0     | 0     |
| V5      | 0     | 0     | 1     |
| V6      | 1     | 0     | 0     |
| OUT     | 1     | 1     | 1     |

The R number of FPGA blades 136 can operate in parallel. That is, each FPGA blade 136 (or some subset thereof) can be contemporaneously executing a SAT circuit 162, and in some examples a Boolean circuit 164 based on a corresponding CNF file of the array of CNF files 138. In this manner, the aggregate search time for the SAT solvers implemented as SAT circuits 162 can be curtailed. As one example, Equation 2 defines a number of bits, $S_{bits}$ needed to implement a Boolean expression.

$$S_{bits} = \text{ceil}(\log_2(N)+1)*I*G \qquad \text{Equation 2:}$$

Wherein:

ceil( ) is a function that returns a smallest integer value that is bigger than or equal to a number;

N is the number of literals input in a CNF file;

I is the number of literals per OR clause in the CNF file; and

G is the number of OR clauses in the Boolean expression that are fed into an AND gate.

Thus, in a situation where the selected FPGA blade 136 of the hardware prototyping platform has 128 megabytes of memory (embedded into the FPGA blade 136 and/or memory extended), and wherein the selected FPGA blade 136 would be able to implement a SAT circuit 162 and a Boolean circuit 164 (corresponding to a CNF file) with about 8460 input literals. Accordingly, the SAT circuit 162 and the selected Boolean circuit 164 can physically instantiate a relatively complex Boolean expression. Moreover, this complexity can be compounded by increasing the number of FPGA blades 136 in the hardware prototyping platform that can operate in parallel.

In any such described example, the selected FPGA blade 136 can return results of the SAT circuit 162 searching the corresponding Boolean expression or the corresponding Boolean circuit 164 to the controller 150, which results can be referred to as SAT circuit results. The SAT circuit results can include a list of results for the Boolean expression evaluated by the SAT circuit 162 for the selected FPGA blade 136. The potential results can include a list of potential-counter examples, a dead-end found, or a potentially unreachable solution. The controller 150 can collect such results from each of the FPGA blades 136 (or some subset thereof) and provide the results to the formal verification EDA application 130. The formal verification EDA application 130 can store the collected results as SAT solver results 170.

The formal verification EDA application 130 can include a bug validator 172 that can validate the SAT solver results 170. In some examples, the bug validator 172 can identify a particular property of the set of properties 120 that was employed to generate the CNF file for the selected FPGA blade 136, which can be referred to as an identified property 174. The bug validator 172 can re-evaluate a Boolean expression for the identified property 174 based on a potential-counter example and validate the potential counter example as a bug, which is referred to as a counter-example 176. In such a situation the bug validator 172 can store the counter-example 176 and the identified property 174 in the memory 106.

Further, in a situation where the SAT solver results 170 indicates that there is a potentially unreachable solution or the SAT circuit 162 reached a dead end, the bug validator 172 can validate each such potential results for the identified property 174. Such results can be employed, for example to update data constraints and/or store an indication that no-counter examples to the identified property 174 are found.

Additionally, in any such situation a bug tracer 178 of the formal verification EDA application 130 may determine that additional searching of a search space for the identified property 174 is needed. For instance, in the given example, the three potential counter-examples (that would be validated as counter-examples 176) would not be all of the possible counter-examples for the identified property 174. Thus, in such a situation, the bug tracer 178 can update constraints and/or initial values for the identified property 174 and provide the identified property along with the updated constraints and/or initial values to the CNF generator 137. The CNF generator 137 can provide an updated CNF file for the array of CNF files 138 that is re-evaluated by the hardware prototyping platform 132 in a manner discussed herein.

The update to the constraints and/or the initial values can be based on the bug hunting algorithm selected for the corresponding property employed to generate the CNF file. As noted, the bug hunting algorithm could be the trace swarm algorithm or the state swarm algorithm (and/or another bug hunting algorithm).

Figure 4:
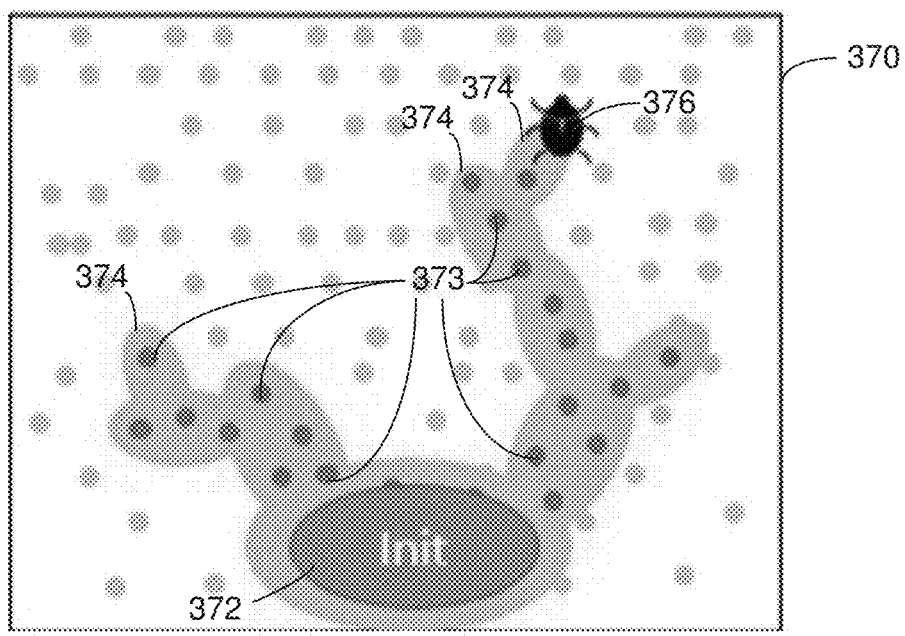
FIG. 4 illustrates a diagram of a state space depicting a conceptual example of a state swarm algorithm for bug hunting.

FIG. 4 illustrates a diagram of a state space 370 depicting a conceptual example of a state swarm algorithm. The state space 370 can represent all possible values that can be input into a Boolean expression (e.g., the Boolean expression 300 represented by the CNF file of FIG. 3 in the given example). The state space 370 is searched from an initial position 372 (corresponding to the selected initial states) and neighboring initial positions 373 (each corresponding to updated initial states, and only some of which are labeled) that are within the vicinity of regions of the state space 370 that are searched are represented as a searched region 374 (labeled at multiple points). The searched region 374 can be formed of a plurality of interconnected ellipses representing individual searches of the state space 370 (covers). Moreover, a bug icon 376 represents a bug (e.g., a counter-example for a property) within the state space 370. Stated differently, each neighboring initial position 373 is interconnected through the searched region. In this manner, as the searched region gets larger, the chances (probabilistically) of finding the bug represented by the bug icon 376 is increased. Accordingly, the state space 370 is explored by finding a path from the neighboring initial positions 373 to expand the searched region 374 toward the bug represented by the bug icon 376 through a series of covers.

Figure 5:
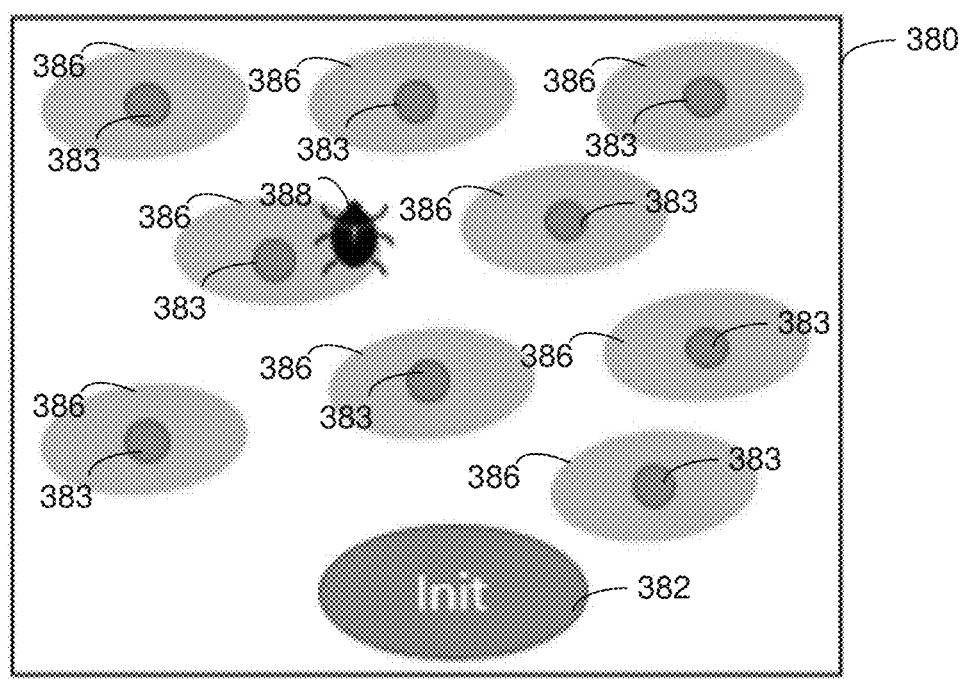
FIG. 5 illustrates a diagram of a state space depicting a conceptual example of a trace swarm algorithm for bug hunting.

FIG. 5 illustrates a diagram of a state space 380 depicting a conceptual example of a trace swarm algorithm. The state space 380 can represent all possible values that can be input into a Boolean expression (e.g., the Boolean expression 300 represented by the CNF file of FIG. 3 in the given example). The state space 380 is searched from an initial position 382 (corresponding to the selected initial states) and unconnected initial positions 383 (each corresponding to updated initial states) that form starting points for regions of the state space 370 that are searched are represented with as searched regions 386. The searched regions 386 are illustrated as ellipses representing individual searches of the state space 380 (covers). Moreover, a bug icon 388 represents a bug (e.g., a counter-example for the property) within the state space 370. Stated differently, each initial position 383 is circumscribed by a portion of the state space 380 that corresponds to a particular searched region. In this manner, as the number of searches increase, the overall portion of the state space 380 that has been searched increases and the chances of finding the bug represented by the bug icon 388 increase. In this manner, the state space 380 is explored by finding different starting points (initial positions 383) and exploring vicinities of the state space 380 around the initial positions represented by the searched regions 386.

Referring back to FIG. 1, through the bug hunting algorithm, different regions of the same state space can be explored in parallel on the hardware prototyping platform 132 (e.g., on the same or different FPGA blades 136). In this manner, the formal verification EDA application 130 and the hardware prototyping platform 132 can operate in concert to potentially yield multiple paths to particular counter-examples 176 of a property (bugs) for the circuit design 102. That is, the formal verification EDA application 130 would operate as a coordinator for the searches and the hardware prototyping platform 132 would execute the searches with multiple instances of the SAT circuit 162.

Additionally, in some examples, the identified property 174 and the counter example 176 can be provided to the remote system 114 as formal verification results. The remote system 114 can output information identifying the counter example 176 and the identified property 174 to a user. Further, in response, in some examples the user may employ the logic synthesis EDA application, or other EDA application to update or otherwise modify the circuit design 102. In this situation, the updated circuit design 102 (or some portion of the circuit design 102) can be re-evaluated by the formal verification EDA application 130 and the hardware prototyping platform 132. In other examples, the user may be satisfied with the formal verification results (e.g., few or no bugs detected), such that the circuit design 102 may be advanced to a next stage (e.g., hardware prototyping and/or fabrication).

By employing the system 100, a plurality of contemporaneously executing SAT circuits 162 can evaluate the SAT problem on Boolean expressions represented as an instruction set or as Boolean circuits 164. That is, the system 100 implements a portion of operations needed for formal verification with physically instantiated circuits, such that the time needed to execute an adequate formal verification of the circuit design 102 can be curtailed. Moreover, by increasing the number of FPGA blades 136 of the hardware prototyping platform 132, the time needed to execute the formal verification of the circuit design 102 can be further curtailed.

Figure 6:
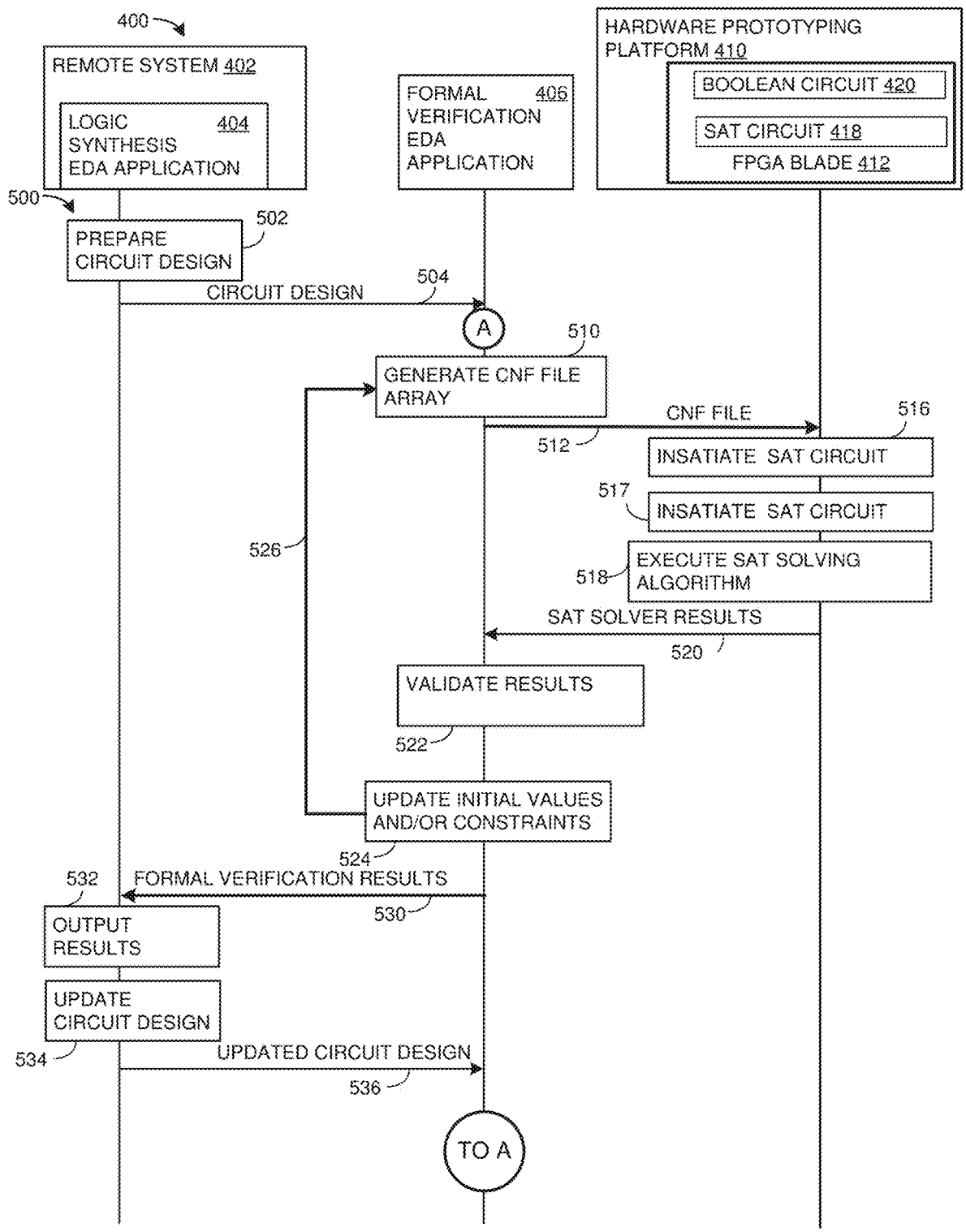
FIG. 6 illustrates timing diagram of a system for executing a formal verification of a circuit design with a formal verification EDA application operating in concert with a hardware prototyping algorithm.

FIG. 6 illustrates a timing diagram depicting an example of a timing of operations by a system 400 for implementing a method 500 for executing a formal verification of a circuit design. The timing of the operations could occur in other orders from that shown. The system 400 can include a remote system 402 that executes a logic synthesis EDA application 404. The system 400 can also include a formal verification EDA application 406 and a hardware prototyping platform 410. In some examples, a logic simulation EDA application can be employed in place of or in concert with the logic synthesis EDA application 404. The logic synthesis EDA application 404 and the formal verification EDA application 406 can operate on separate computing platforms or on the same computing platform. Moreover, the formal verification EDA application 406 can be implemented with the formal verification EDA application 130 operating on the computing platform 104 of FIG. 1. Similarly, the hardware prototyping platform 410 can be implemented with the hardware prototyping platform 132 of FIG. 1.

The hardware prototyping platform 410 includes an FPGA blade 412. In the example illustrated in FIG. 4, one FPGA blade 412 is included in the hardware prototyping platform 410. However, in other examples, there could be a plurality of FPGA blades 412 operating in parallel, such as the R number of FPGA blades 136 of FIG. 1.

For purposes of simplification of explanation, it is presumed that the logic synthesis EDA application 404 and/or the formal verification EDA application 406 is executing on or in communication with the remote system 402. Accordingly, it is presumed that the logic synthesis EDA application 404 and the formal verification EDA application 406 includes features to provide output to a user interface.

At 502 the logic synthesis EDA application 404 is employed to prepare a circuit design (e.g., the circuit design 102 of FIG. 1). The circuit design includes an RTL model and a set of properties (e.g., conditions that indicate a bug in the circuit design). The circuit design can also include a list of constraints (e.g., illegal states).

At 504, the circuit design is provided to the formal verification EDA application 406. In the example illustrated, the circuit design is provided from the logic synthesis EDA application 404. However, in other examples, the circuit design can be provided from another type of EDA application, such as a logic synthesis EDA application.

The formal verification EDA application 406 operates in concert with the hardware prototyping platform 410 to execute a formal verification on the received circuit design. More particularly, at 510, the formal verification EDA application 406 parses the circuit design to generate a CNF file array for the circuit design. Each CNF file in the CNF file array (e.g., one or more CNF files) can represent a Boolean expression based on a corresponding property selected from the list of properties in the circuit design. Additionally, the formal verification EDA application 406 can generate a set of initial states for data fields of the CNF files in the CNF file array. Still further, the CNF files in the CNF file array can include data fields with constraints based on the constraints listed in the circuit design. The initial states and/or the constraints can be based, for example on features of the circuit design and/or a selected bug hunting algorithm, such as a swarm bug hunting or trace bug hunting.

At 512, a CNF file of the array of CNF files generated by the formal verification EDA application 406 is provided to the hardware prototyping platform 410. In response, at 516 a controller of the hardware prototyping platform 410 can cause the FPGA blade 412 to physically instantiate a SAT circuit 418 on the FPGA blade 412. In some examples, the SAT circuit 418 can be gate level circuit for a specific purpose processor that executes instructions in an instruction set (e.g., opcode) for solving the SAT problem on a Boolean expression. In some examples, at 517, the controller of the hardware prototyping platform 410 can cause the FPGA blade 412 to physically instantiate a Boolean circuit 420. The Boolean circuit 420 can be a gate-level circuit that implements the Boolean expression characterized in the CNF file provided to the hardware prototyping platform 410. The SAT circuit 418 can be a circuit that physically instantiates an instance of the SAT solver 160 illustrated in FIG. 1. In some examples, the Boolean expression can be represented with an instruction set (e.g., opcode) for the SAT circuit 162 that can be generated by the controller of the hardware prototyping platform 410. In these situations, the Boolean circuit 420 may not be instantiated.

At 518, the SAT circuit 418 executes a SAT solving algorithm to implement search on a portion of a state space of the Boolean expression (characterized by the instruction set or the Boolean circuit 420) attempting to find values that cause the Boolean circuit 420 to output a logical 1 (e.g., TRUE) until a criterion is met. In some examples, the criterion can be a full search of a search space for the Boolean expression has been completed, such that the SAT circuit 418 determines that the solution to the Boolean expression is potentially unreachable. In other examples, SAT circuit 418 can be configured to stop a search after a predetermined number of potential counter-examples are found. The predetermined number could be one or more. Each potential counter-example can be a set of values for the input literals that cause the Boolean expression to output a logical 1. In still other examples, the SAT circuit 418 can be configured to stop the search once a search algorithm being executed (e.g., a depth first or breadth first search algorithm) reaches a dead-end. The listed criteria are not meant to be exclusive. That is, in some examples, the SAT circuit 418 can be configured to stop when any of the criteria are met (or some subset thereof).

At 520, results of the search executed by the SAT solving algorithm (SAT solver results) can be returned the formal verification EDA application 406. At 522, the formal verification EDA application 406 can validate the SAT solver results from the hardware prototyping algorithm. Based on the results of the validation, at 524, the formal verification EDA application 406 may update the initial values and/or constraints for the property of the circuit design corresponding to the CNF file. The formal verification EDA application 406 may update the initial values and/or constraints in situations where additional searching of a search space for the Boolean expression representing the property of the circuit design is needed. If additional searching is needed, at 526, the formal verification EDA application 406 returns to 510. If no additional searching is needed, at 530, formal verification results are returned to the remote system 402. At 532, results of the formal verification EDA application 406 can be output to a user.

In some examples, based on the results of the formal verification at 534, the circuit design can be updated by the logic synthesis EDA application 404. At 536, the updated circuit design can be provided to the formal verification EDA application 406. The method 500 can proceed to node A, such that the method 500 returns to 510.

Figure 7:
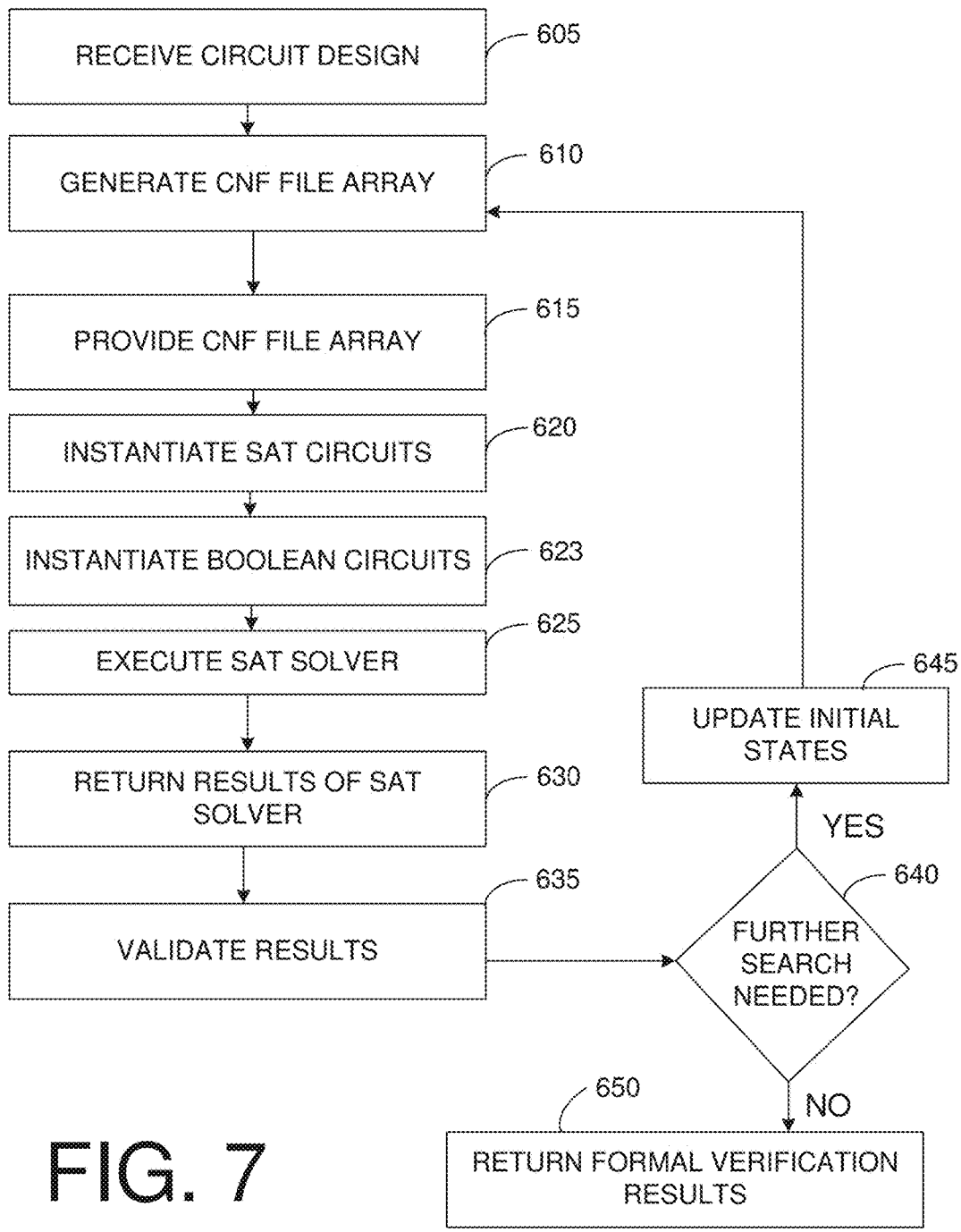
FIG. 7 illustrates a flow chart of an example method of executing a formal verification of a circuit design with a formal verification EDA application operating in concert with a hardware prototyping algorithm.

In view of the foregoing structural and functional features described above, example methods will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 7 illustrates a flowchart of an example method 600 for executing a formal verification of a circuit design of an IC chip. The method 600 can be implemented by a computing platform executing a formal verification EDA application and a hardware prototyping platform operating in concert, such as the formal verification EDA application 130 executing on the computing platform 104 and the hardware prototyping platform 132 of the system 100 of FIG. 1 and/or the system 400 of FIG. 6. At 605, the formal verification EDA application can receive a circuit design of the IC chip. The circuit design can include an RTL model, a set of properties for the IC chip and constraints (e.g., illegal states). The circuit design can be provided from a remote system, such as a remote system executing a logic synthesis EDA application and/or a remote system with a user interface for the formal verification EDA application.

At 610, the formal verification application can generate an array of CNF files based on features of the circuit design, including the RTL model, the set of properties and the constraints of the circuit design. Each CNF file can include a Boolean expression that characterizes a selected property of the set of properties of the circuit design and data fields characterizing initial states for literals (variables) in the Boolean expression and the constraints of the circuit design. At 615, the formal verification application can provide the array of CNF files to the hardware prototyping platform.

At 620, the hardware prototyping platform instantiates a SAT circuit in an FPGA blade (e.g., an FPGA blade 136 of FIG. 1) for a corresponding Boolean expression for each CNF file in the array of CNF files. In some examples, 623, the hardware prototyping platform also instantiates a Boolean circuit (e.g., a gate level circuit) in the FPGA blade for the corresponding Boolean expression for each CNF file in the array of CNF files. In some examples, each Boolean expression for each CNF file in the array of CNF files can characterized as a set of instructions for the SAT circuit (e.g., implemented as a specific purpose processor). In such examples, operations at 623 may be omitted.

At 625, the hardware prototyping platform executes a hardware instantiated SAT solver (e.g., the SAT circuit 162 of FIG. 1) for each Boolean expression or each Boolean circuit that corresponds to a CNF file of the array of CNF files. At 630 results of the hardware instantiated SAT solver for each Boolean expression or each Boolean circuit are returned to the formal verification EDA application as SAT solver results.

At 635, the formal verification EDA application validates the SAT solver results. At 640, the formal verification EDA application makes a determination as to whether a further search is needed based on the validated results. If the determination at 640 is positive (e.g., YES), the method 600 proceeds to 645. If the determination at 640 is negative (e.g., NO), the method 600 proceeds to 650. At 645, the initial states for the CNF file are updated, and the method 600 returns to 610. At 650, the results of the formal verification executed by the formal verification EDA application and the hardware prototyping platform can be returned to the remote system.

Figure 8:
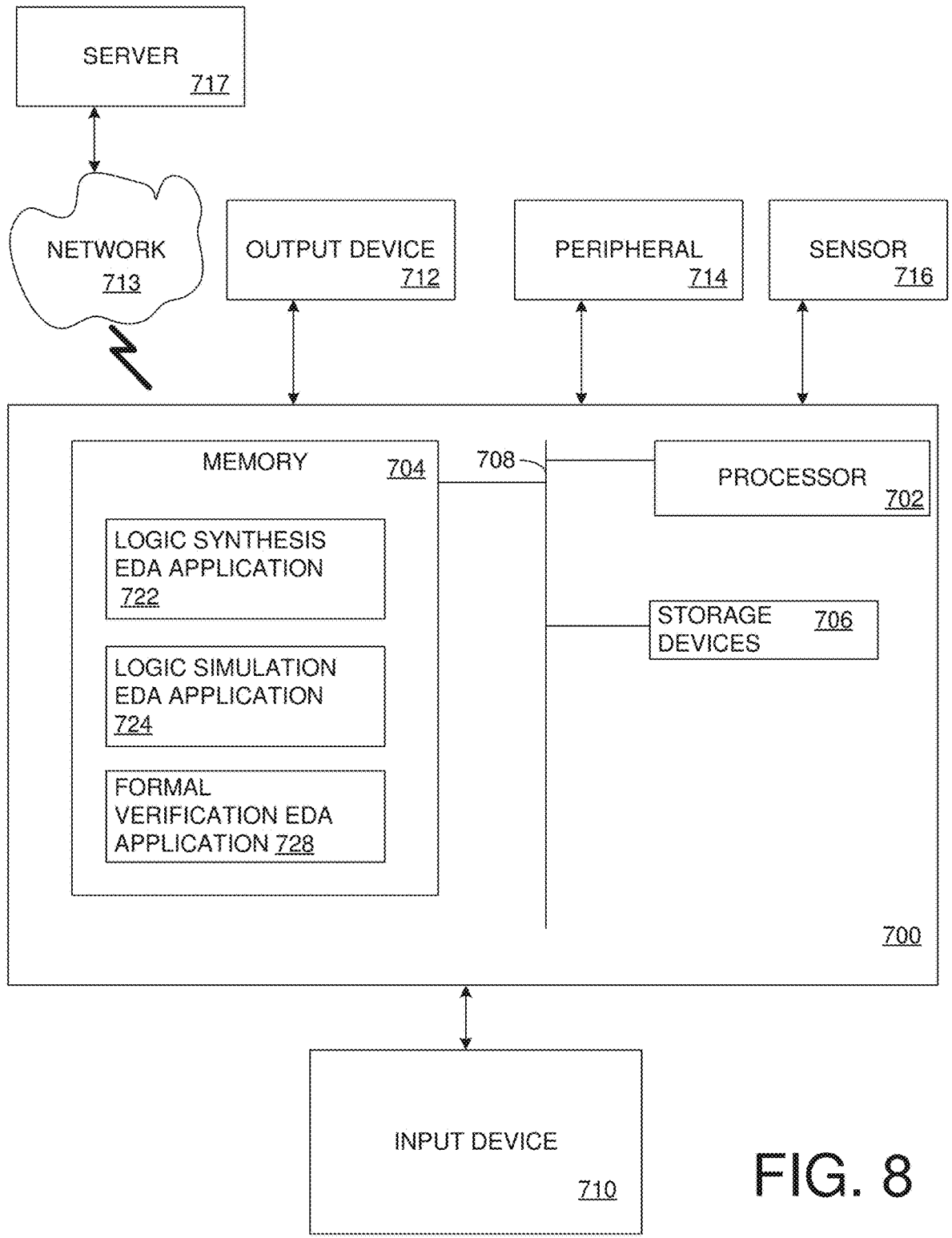
FIG. 8 illustrates an example of a computing system employable to execute a plurality of EDA applications including a formal verification EDA application.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. As shown in FIG. 8, the computing system 700 can include a computer processor 702, associated memory 704 (e.g., RAM), cache memory, flash memory, etc.), one or more storage devices 706 (e.g., a solid state drive, a hard disk drive, an optical drive such as a compact disk (CD) drive or digital versatile disk (DVD) drive, a flash memory stick, etc.) and numerous other elements and functionalities. The computer processor 702 may be an IC chip for processing instructions. For example, the computer processor may be one or more cores, or micro-cores of a processor. Components of the computing system 700 can communicate over a data bus 708.

The computing system 700 may also include an input device 710, such as any combination of one or more of a touchscreen, keyboard, mouse, microphone, touchpad, electronic pen, or any other input device. Further, the computing system 700 can include an output device 712, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 712 can be the same physical device as the input device 710. In other examples, the output device 712 and the input device 710 can be implemented as separate physical devices. The computing system 700 can be connected to a network 713 (e.g., LAN, a wide area network (WAN) such as the Internet, a mobile network, or any other type of network) via a network interface connection (not shown). The input device 710 and output device(s) 712 can be connected locally and/or remotely (e.g., via the network 713) to the computer processor 702, the memory 704 and/or the storage device 706. Many different types of computing systems exist, and the aforementioned input device 710 and the output device 712 can take other forms. The computing system 700 can further include a peripheral 714 and a sensor 716 for interacting with the environment of the computing system 700 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 700 can communicate with a server 717 via the network 713.

The memory 704 can include a plurality of EDA applications that can be employed to generate a circuit design and/or execute a simulation of the circuit design, or a formal verification. More particularly, the memory 704 can include a logic synthesis EDA application 722, a logic simulation EDA application 724, and a formal verification EDA application 728 or any combination of these EDA applications. The formal verification EDA application 728 can communicate with a hardware prototyping platform to execute formal verification of circuit designs in a manner discussed herein.

Further, one or more elements of the aforementioned computing system 700 can be located at a remote location and connected to the other elements over a network 713. Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on". Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine readable instructions, the machine readable instructions comprising a formal verification electronic design automation (EDA) application, the formal verification EDA application being configured to:
   receive a circuit design of an integrated circuit (IC) chip, the circuit design of the IC chip comprising a set of properties for the IC chip and constraints for the IC chip and a register-transfer level (RTL) model;
   generate an array of conjunctive normal form (CNF) files based on the circuit design of the IC chip, each CNF file in the array of CNF files comprising:
      a Boolean expression based on the RTL model that characterizes a selected property of the set of properties; and
      data fields characterizing initial states for literals in the Boolean expression based on the RTL model and the constraints of the IC chip; and
   output the array of CNF files to a hardware prototyping platform, the hardware prototyping platform being configured execute a hardware instantiated Boolean satisfiability problem (SAT) solver for the Boolean expression based on the RTL model in each CNF file in the array of CNF files, to instantiate a plurality of SAT solvers in parallel operating on a plurality of field-programmable gate array (FPGA) blades.

2. The medium of claim 1, wherein the formal verification EDA application is further configured to receive results from the hardware prototyping platform that characterizes results of each of the plurality of hardware instantiated SAT solvers executed on the circuit design implemented for the array of CNF files.

3. The medium of claim 2, wherein the results from the hardware prototyping platform comprises a potential counter-example for a selected property characterized in a given CNF file of the array of CNF files.

4. The medium of claim 3, wherein the formal verification EDA application is configured to identify a bug in the circuit design based on the potential counter-example for the selected property of the given CNF file of the array of CNF files.

5. The medium of claim 3, wherein the formal verification EDA application selects the initial states for each CNF file in the array of CNF files based on a selected bug hunting algorithm.

6. The medium of claim 5, wherein the bug hunting algorithm is one of a state swarm and a trace swarm, wherein the formal verification EDA application is configured to:
   update the initial states for the given CNF file; and
   provide the CNF file with the updated initial states to the hardware prototyping platform.

7. The medium of claim 1, the hardware prototyping platform physically instantiates a Boolean circuit corresponding to the Boolean expression in each CNF file in the array of CNF files and the each of the plurality of hardware instantiated Boolean SAT solvers evaluates the SAT problem for each Boolean circuit.

8. The medium of claim 7, wherein the plurality of hardware instantiated SAT solvers execute contemporaneously for a corresponding set of Boolean circuits that correspond to a respective CNF file of the array of CNF files.

9. The medium of claim 1, wherein each of the plurality of SAT solvers further comprise a gate-level netlist for the circuit design that is executable by the plurality of FPGA blades.

10. A system comprising:
    a non-transitory memory that stores machine readable instructions; and
    a processing unit that accesses the memory and executes the machine readable instructions, the machine readable instructions comprising:
       a formal verification electronic design automation (EDA) application, the formal verification EDA application being configured to:

receive a circuit design of an integrated circuit (IC) chip, the circuit design of the IC chip comprising a set of properties for the IC chip constraints for the IC chip and a register-transfer level (RTL) model; and generate an array of conjunctive normal form (CNF) files based on the design of the IC chip, each CNF file comprising:
- a Boolean expression based on the RTL model that characterizes a selected property of the set of properties; and
- data fields characterizing initial states for literals in the Boolean expression based on the RTL model and the constraints of the IC chip; and a hardware prototyping platform, communicatively coupled to the formal verification EDA application, the hardware prototyping platform being configured to:
- execute a hardware instantiated Boolean satisfiability problem (SAT) solver for each Boolean expression based on the RTL model that corresponds to a CNF file of the array of CNF files, to instantiate a plurality of SAT solvers in parallel operating on a plurality of field-programmable gate array (FPGA) blades; and
- return results of the plurality of hardware instantiated SAT solvers for each Boolean expression to the formal verification EDA application.

11. The system of claim 10, wherein the results of the hardware prototyping platform comprises a potential counter-example for a selected property characterized in a given CNF file of the array of CNF files.

12. The system of claim 11, wherein the formal verification EDA application is configured to identify a bug in the circuit design based on the potential counter-example for the selected property of the given CNF file of the array of CNF files.

13. The system of claim 12, wherein the formal verification EDA application executes a bug hunting algorithm on the circuit design in response to identifying the bug in the circuit design.

14. The system of claim 13, wherein the bug hunting algorithm is a one of a state swarm and a trace swarm, wherein the formal verification EDA application is configured to:
- update the initial states for the given CNF file; and
- provide the CNF file with the updated initial states to the hardware prototyping platform.

15. The system of claim 10, the hardware prototyping platform physically instantiates a Boolean circuit corresponding to the Boolean expression in each CNF file in the array of CNF files and the plurality of hardware instantiated Boolean SAT solvers evaluates the SAT problem for each Boolean circuit.

16. The system of claim 15, wherein the plurality of hardware instantiated SAT solvers execute contemporaneously for a corresponding set of Boolean circuits that correspond to a respective CNF file of the array of CNF files.

17. The system of claim 10, wherein each of the plurality of SAT solvers further comprise a gate-level netlist for the circuit design that is executable by the plurality of FPGA blades.

18. The system of claim 10, wherein the hardware prototyping platform generates an instruction set for the Boolean expression based on the RTL model for the SAT solvers.

19. A method comprising:
receiving a circuit design of an integrated circuit (IC) chip, the circuit design of the IC chip comprising a set of properties for the IC chip and a register-transfer level (RTL) model;

generating, by a formal verification electronic design automation (EDA) application, an array of conjunctive normal form (CNF) files based on the design of the IC chip, each CNF file comprising:
- a Boolean expression based on the RTL model that characterizes a selected property of the set of properties; and
- data fields characterizing initial states for literals in the Boolean expression based on the RTL model;

execute, by a hardware prototyping platform, a hardware instantiated Boolean satisfiability problem (SAT) solver for each Boolean expression based on the RTL model that corresponds to a CNF file of the array of CNF files, to instantiate a plurality of SAT solvers in parallel operating on a plurality of field-programmable gate array (FPGA) blades; and returning results of the plurality of hardware instantiated SAT solvers for each Boolean expression based on the RTL model to the formal verification EDA application.

20. The method of claim 19, wherein the results of the plurality of hardware instantiated SAT solvers comprises a potential counter-example for a selected property characterized in a given CNF file of the array of CNF files.

* * * * *